US005300178A

United States Patent [19]
Nelson et al.

[11] Patent Number: 5,300,178
[45] Date of Patent: Apr. 5, 1994

[54] INSULATION ARRANGEMENT FOR MACHINERY

[75] Inventors: Thomas E. Nelson; Daniel J. Eigel, both of Anchorage, Ky.

[73] Assignee: Soltech Inc., Shelbyville, Ky.

[21] Appl. No.: 939,417

[22] Filed: Sep. 3, 1992

Related U.S. Application Data

[60] Continuation of Ser. No. 693,436, Apr. 29, 1991, abandoned, which is a division of Ser. No. 475,810, Feb. 6, 1990, abandoned.

[51] Int. Cl.$^5$ ............................................. B32B 31/26
[52] U.S. Cl. ................................ 156/292; 156/275.1; 156/308.4; 181/290; 181/291
[58] Field of Search ............. 156/292, 213, 285, 212, 156/297, 275.1, 308.4; 181/291, 290; 52/145

[56] References Cited

U.S. PATENT DOCUMENTS

| | | | |
|---|---|---|---|
| 1,773,909 | 8/1930 | Korb | 415/112 |
| 2,235,962 | 3/1941 | Hornady | 417/312 |
| 2,296,702 | 9/1942 | Butler et al. | 415/175 |
| 3,058,704 | 10/1962 | Bergstedt | 181/291 |
| 3,360,193 | 12/1967 | Harris et al. | 417/312 |
| 3,462,949 | 8/1969 | Anderson et al. | 60/39.31 |
| 3,676,012 | 7/1972 | Brockie | 415/119 |
| 3,688,867 | 9/1972 | Antonetti et al. | 181/205 |
| 3,736,074 | 5/1973 | Kilbane et al. | 417/279 |
| 3,778,184 | 12/1973 | Wood | 415/209.4 |
| 3,821,999 | 7/1974 | Guess et al. | 181/296 |
| 3,947,148 | 3/1976 | Holt | 415/119 |
| 3,948,347 | 4/1976 | Rutledge | 181/291 |
| 3,989,415 | 11/1976 | Van-Hee et al. | 417/312 |
| 4,022,550 | 5/1977 | Brink et al. | 417/234 |
| 4,150,913 | 4/1979 | Davis | 415/119 |
| 4,194,329 | 3/1980 | Wendt | 181/291 |
| 4,200,171 | 4/1980 | Seymour et al. | 181/291 |
| 4,248,647 | 2/1981 | Herron et al. | 181/291 |
| 4,264,282 | 4/1981 | Crago | 417/243 |
| 4,347,042 | 8/1982 | Holdsworth | 417/53 |
| 4,359,085 | 11/1982 | Mueller | 165/47 |
| 4,411,592 | 10/1983 | Traver et al. | 415/119 |
| 4,553,631 | 11/1985 | Panza | 181/291 |
| 4,594,278 | 6/1986 | Nixon | 181/291 X |
| 5,055,341 | 10/1991 | Yamaji et al. | 181/291 |

FOREIGN PATENT DOCUMENTS

| | | | |
|---|---|---|---|
| 123758 | 6/1945 | Australia | 181/291 |
| 290560 | 12/1966 | Australia | 181/291 |
| 1330924 | 5/1963 | France | 181/291 |
| 2121033 | 6/1987 | Japan | 156/309.6 |

*Primary Examiner*—Michael W. Ball
*Assistant Examiner*—Francis J. Lorin
*Attorney, Agent or Firm*—Woodard, Emhardt, Naughton, Moriarty & McNett

[57] ABSTRACT

An acoustical panel for use in sound reduction in connection with air compressors and similar equipment includes two oppositely disposed layers of synthetic film material which in the preferred embodiment is polyvinychloride and an intermediate layer of acoustical insulation material disposed between the two outer layers wherein the preferred material for the intermediate layer is fiberglass. The acoustical panel is made in one embodiment by adhesively bonding the first outer layer of synthetic film material to one side of the intermediate layer and then adhesively bonding the other outer layer of synthetic film material to the opposite side of the intermediate layer. Once the adhesive bonding is completed, the outer peripheral edges of each outer panel are placed in abutment and heat-sealed so as to encase the intermediate layer. The encasement in layers of synthetic film material prevents any moisture absorption by the intermediate layer and the encasement further prevents any reduction in the fibrous content of the intermediate layer due to air flow pressure.

1 Claim, 2 Drawing Sheets

INSULATION ARRANGEMENT FOR MACHINERY

This application is a continuation of application Ser. No. 07/693,436, filed Apr. 29, 1991, now abandoned which is a divisional of application Ser. No. 07/475,210, filed Feb. 6, 1990, abandoned.

BACKGROUND OF THE INVENTION

The present invention relates generally to insulation concepts and in particular to insulation arrangements for machinery such as air compressors.

Many commercial and industrial air compressor devices are utilized in work areas where the maximum noise level allowable is regulated by the government or is controlled based upon the general desire of those controlling the work area to provide a comfortable working environment. One work environment where substantial levels of noise can and are generated involve work areas where machinery such as air compressors are present. Although a variety of mechanical devices of different designs are utilized to provide compressed air for the workplace, there are several common features used in the design of most industrial air compressors. Included in these common features are an outer enclosure of steel or other rigid material, the necessary mechanical and electrical components to produce compressed air, and acoustical insulation materials placed so that they are between the enclosure and the noise-generating mechanism that produces the compressed air.

In many cases the environment in which the air compressor device is used exposes the enclosure, insulation and mechanical components to extremes in temperature, saturation by water, dirt, dust, and chemicals as well as exposure to various airborne particulates, liquids and vapors. The compressor must be designed so that the mechanical and electrical components and the acoustical insulation will perform as designed under any of these extreme conditions.

Much time and effort has been put into the design of electric motors, mechanical pumps and other machinery components over the years in an attempt to insure that these devices will not only function under extreme environmental conditions, but will at the same time hopefully meet or exceed various governmental and environmental rules and regulations. On an ever-increasing basis, there have been concerns and additional governmental regulations addressing the varous noise levels in the work place and in view of these concerns and additional regulations, attention has been focused on the development of effective sound-insulating materials and designs which will not only meet the required regulations as to noise abatement, but will also perform under the environmental extremes.

Unfortunately, to date, efforts seem to have been focused on one or the other of these two objectives, but not on both. Certain efforts have been directed to very high-quality sound-absorbing or sound-deadening designs, but these have not been designed in a manner so as to meet or exceed all the constraints imposed by the environmental extremes. Acoustical insulation designs which have a greater likelihood of success under the extreme environmental conditions described above, have not proven to be as effective in the area of sound reduction.

To date, the more common insulating materials have been either a flexible urethane foam or a fiberglass insulation material. Usually a facing is put on the exposed surface of both materials in an attempt to make them more durable for use in the environment with its various extremes. However, both of these materials have critical drawbacks when used in this particular application.

Urethane foam can be produced so that its cell structure is comprised of a large percentage of "closed cells" that will not absorb moisture, oil or other liquids. However, there will be some percentage of open cells in this urethane foam structure that can absorb moisture, oil, or other liquids. Once this material begins any type of absorption of moisture, oil or other liquids, this will reduce the acoustical insulation qualities of the urethane foam. Urethane foam is also a fairly delicate material which is susceptible to tearing and other damage due to handling and assembly into machinery. While some of this susceptibility to damage can be reduced by covering the urethane foam with a suitable facing material, the urethane foam is substantially more expensive than is fiberglass, approximately three times more expensive for the same thickness and density. If a facing material must be added to this more expensive urethane foam as a protective covering, this results in making the overall package even more expensive. Further, urethane foam does not perform as well as fiberglass in noise-absorption tests when using the same thickness and density of material.

With regard to fiberglass insulation, it is a much better sound-absorbing material than is urethane foam in its manufactured form. Fiberglass insulation is also more cost-effective in that it costs approximately one-third of urethane foam. However, there are certain drawbacks to the use of fiberglass insulation material and these drawbacks include the open fibrous nature of the material. This openness makes fiberglass insulation more prone to moisture absorption. If a liquid saturates the material, its sound-absorbing or sound-deadening qualities are dramatically reduced. Consequently, if the air compressor in which this fiberglass insulation may be used comes in contact with water or oil or other liquids, the open fibrous nature of the material allows absorption and an effective elimination of any sound absorbing or sound deadening properties.

With regard to air compressor designs, those which are of the enclosed type typically rely on some type of air flow in order to cool the electric motor or piston engine which is located inside. The piston engine can also generate an extreme air flow condition for exhausting its engine exhaust from the enclosure. These air flow extremes when blowing up against the open fibrous fiberglass insulation can actually erode fibers from the batting and this also has a negative effect on the sound absorption performance of the fiberglass insulation. This situation makes some form of a covering a necessity with fiberglass insulation. However, facing on one or both sides of the fiberglass insulation alone will not eliminate all the negative conditions because cut-outs must still be made through the material in order to allow pipes, wires and other functional conduits to extend through the insulation.

While the present invention focuses primarily on the specific design concept of acoustical insulation for air compressors and similar machinery, there are certain designs and insulation concepts which are disclosed in prior patents which may be of interest with regard to a more complete understanding of the background of the present invention.

Mueller (Pat. No. 4,359,085 issued Nov. 16, 1982) discloses in its exemplary embodiment two machines which are arranged in a common cabinet-like housing which is insulated toward the interior from sound conducted through solids and airborne sound. In order for fresh air to be supplied to the machines within the housing, common fresh air channels are provided which are connected by way of an inlet port to the exterior air. In order to discharge the exhaust air, there is a separately arranged exhaust air series of chambers and/or exhaust air channels which discharge into the open air by way of an common outlet port. The sound-attenuating material which is used in this design consists of two U-shaped covering parts 14 and 15 which are lined with a sound-attenuating material which is intended to insulate the housing toward the exterior from sound conducted through solids and any airborne sound. This is believed to be a fairly typical approach followed and there are not really any specifics given as to the interior design details of these two U-shaped members.

Holdsworth (Pat. No. 4,347,042 issued Aug. 31, 1982) discloses a motor compressor unit and a method of reducing noise transmitted therefrom. The motor compressor unit comprises a compressor for compressing a vapor, a motor for driving the compressor, a shell encompassing the compressor motor, and a supply of lubricant disposed within the shell. The motor compressor unit further comprises a lubricant-absorbent fibrous material which is positioned against the interior surfaces of the shell for dampening sound waves which are generated within the motor compressor unit. The sound dampening materials referred to include lining 20 and cover 22 and as indicated, the lining is intended to be of a lubricant-absorbent fibrous material which would of course reduce its sound-dampening abilities over that of dry material due to the enhanced sound transmission results through liquid as opposed to through air.

Crago (Pat. No. 4,264,282 issued Apr. 28, 1981) discloses an air compressor apparatus which includes noise-reducing means arranged in the form of a noise-reducing enclosure. The air compressor is disposed within a cabinet wherein the inlet and outlet channels that conduct air into and out of the enclosure are lined with sound-absorbing material. This material is an acoustical foam and is provided on these inlet and outlet chambers in order to absorb sound waves originating with the air compressor and passing through these chambers.

Davis (Pat. No. 4,150,913 issued Apr. 24, 1979) discloses a blower for industrial vacuum machinery which is constructed using an impeller with backward curved plates for flow stability and high efficiency under varying conditions. A muffler for the discharge of the blower is provided and noise-deadening material 66 is used to line compartments 58 and 59 and the material selected is a polyurethane packing material of the type used for protection of parcels against breakage. In particular, this material includes a plurality of bubbles which are incorporated in the foam. Again, this particular design like that of Crago is believed to focus on fairly basic approaches where the sound-absorbing or acoustical insulation material is simply exposed foam or fiberglass of similar open material which would suffer from the moisture-absorption concerns and air velocity concerns previously mentioned. These particular prior devices although showing the use of insulation material in the design of air compressors and similar machinery do not focus to any degree on the specific construction, nor do these designs address the problems alluded to above. Other patents are believe to fit into this same general category as the foregoing devices of Mueller, Holdsworth, Crago and Davis. For example, Brink et al. (Pat. No. 4,022,550 issued May 10, 1977) and Van-Hee et al. (Patent No. 3,989,415 issued Nov. 2, 1976) are directed to the same types of concepts and sound-absorption or sound-deadening approaches as the first four patents mentioned.

There are further series of patent references which may be appropriately grouped as to one general type and these include panel designs where the noise-making component is insulated by some type of enclosing or surrounding insulation material disposed between that particular component and an outside enclosure or shell. Representative of this grouping of patents are the following:

| Pat. No. | Patentee | Issue Date |
|---|---|---|
| 4,411,592 | Traver et al. | 10/25/1983 |
| 3,947,148 | Holt | 03/30/1976 |
| 3,778,184 | Wood | 12/11/1973 |
| 3,736,074 | Kilbane et al. | 05/29/1973 |
| 3,688,867 | Antonetti et al. | 09/05/1972 |
| 3,676,012 | Brockie | 07/11/1972 |
| 3,462,949 | Anderson et al. | 08/26/1969 |
| 3,360,193 | Harris et al. | 12/26/1967 |
| 2,296,702 | Butler et al. | 09/22/1942 |
| 1,773,909 | Korb | 08/26/1930 |

In each of the foregoing listed patents, very little attention is given to the specific construction and material selection of the sound-absorbing insulation material. While some attention is given to different insulation concepts in the Antonetti patent, as referenced in FIGS. 4 and 5, the concerns addressed by the present invention are not the focus of any of these earlier inventions. For example, in Korb (Pat. No. 1,773,909), reference to the insulating material indicates that it is only a "suitable" insulating material such as asbestos. In any environment where moisture or liquid absorption was a risk, this material would not be suitable used in this manner in view of its ability to absorb moisture and as a result the loss of any acoustical insulating properties.

Hornady (Pat. No. 2,235,962 issued Mar. 25, 1941) discloses an insulation panel which is used in combination with a refrigerating apparatus. The particular baffle shown includes a frame member 54 which supports a pair of screen elements 56 which in turn hold asbestos fibers 57 in place. The patent indicates that the asbestos fibers very effectively silence the noises yet do not deteriorate when exposed to the flow of lubricant and refrigerant. This patent also points out that sponge rubber which may have been used previously in order to deaden compressor noises could not be used in the cylinder head. What is not addressed in this particular patent as might be expected from its date of issue are the problems with the use of asbestos. As the industry has gone away from the use of asbestos, it has run head-first into the problems of using such materials as sponge rubber and open-cell foam or fiberglass, the same problems which the present invention addresses.

Guess et al. (Pat. No. 3,821,999 issued Jul. 2, 1974) discloses an acoustical liner consisting of a perforated honeycomb sandwich panel wherein the axes of the honeycomb cells are tilted relative to the outer surface for more effective absorption of high amplitude sound and shock waves over a relatively narrow band of the frequency spectrum. While this particular patent focuses more specifically on the design of an acoustic liner and an application to specific sound frequencies, it does not address the concerns of the present invention with regard to air compressor noises and the use of an acoustical insulation design in an environment where exposure to moisture and other liquids is possible.

The present invention provides an acoustical insulation system that eliminates the previously outlined drawbacks of using standard fiberglass or urethane foam materials. The present invention Contemplates an improvement to the specific prior designs discussed above in that it provides the superior acoustical properties of fiberglass (as compared to flexible urethane foam) and it solves the problem of moisture/liquid absorption. The present invention is cost-effective in that it is significantly lower in cost than commonly used flexibe urethane foam materials and it holds up and performs under a wide variety of temperature and other environmental conditions including extreme air velocities flowing through the air compressor.

SUMMARY OF THE INVENTION

An acoustical panel for use in sound reduction according to one embodiment of the present invention comprises a first outer layer of a synthetic film material, a second outer layer of a synthetic film material, an intermediate layer of acoustical insulation material disposed between the first and second outer layers, the first and second outer layers being adhesively bonded to the intermediate layer, and the first and second outer layers being joined together along their outer periphery so as to encase the intermediate layer.

One object of the present invention is to provide an improved acoustical panel for use in sound reduction.

Related objects and advantages of the present invention will be apparent from the following description.

DESCRIPTION OF THE PREFERRED EMBODIMENT

Figure 1:
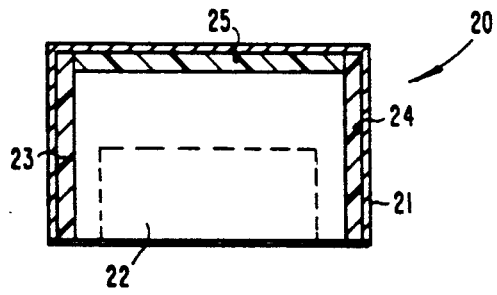
FIG. 1 is a front elevational view in full section of a prior art air compressor design.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
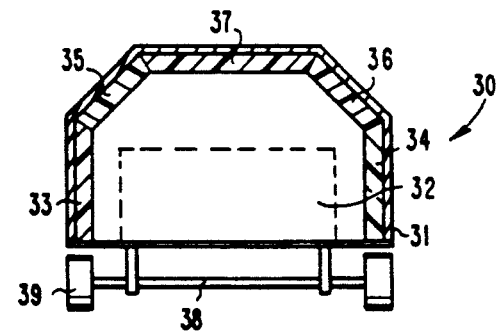
FIG. 2 is a front elevational view in full section of a prior art air compressor design which is portable.

Referring to FIGS. 1 and 2, there are illustrated two of the more-typical industrial devices, specifically air compressors, which represent conventional prior art uses of outer enclosure insulation. While these two devices are both air compressors, the FIG. 1 illustration is intended to denote the cross section of a stationary air compressor which may be used in manufacturing or industrial operations. The FIG. 2 illustration is a cross-sectional view of a portable air compressor for use at construction sites or for road work, etc. While each style of compressor has a different intended environment for use, the insulation approach is virtually the same in each.

Compressor 20 includes an outer metal shell or casing 21 which encloses the compressor, motor and air storage tank which are collectively represented by block 22. In order to try and control or reduce the transmission of sound from the compressor through the casing 21, layers of acoustical insulation material are assembled to the interior facing surfaces of the casing. Shown in FIG. 1 are two side layers 23 and 24 and a top layer 25 of acoustical insulation.

Referring to FIG. 2, compressor 30 includes an outer metal shell or casing 31 which encloses the compressor, motor and air storage tank which are collectively represented by block 32. In order to try and control or reduce the transmission of sound from the compressor through the casing 31, layers of acoustical insulation material are assembled to the interior surfaces of the casing. Shown in FIG. 2 are two side layers 33 and 34, two corner layers 35 and 36, and a top layer 37 of acoustical insulation material. Since compressor 30 is intended to be a portable air compressor, it is illustrated on an axle 38 which includes wheels 39 on each end. The acoustical insulation layers of FIGS. 1 and 2 are representative of the typical or conventional insulation material used in prior art devices as referenced and discussed above.

Figure 3:
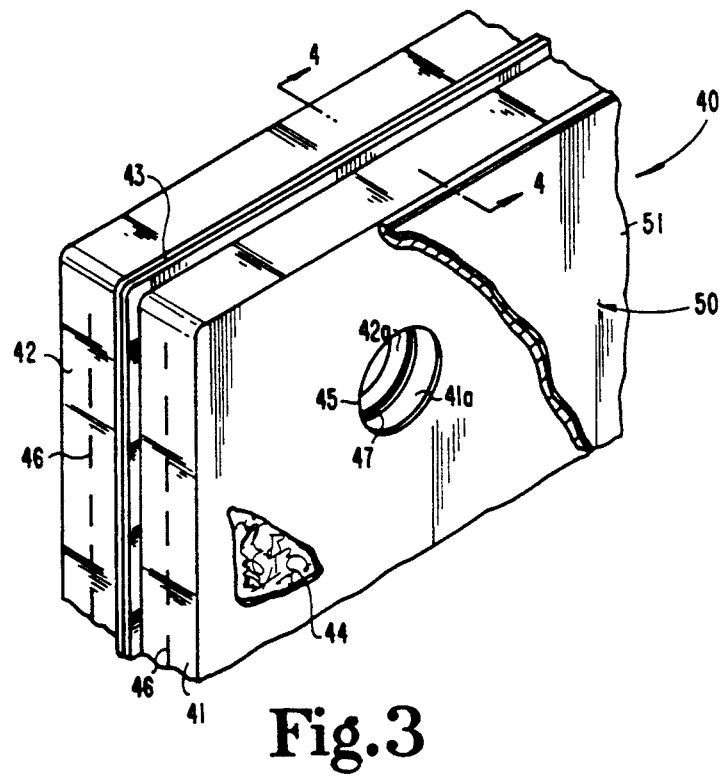
FIG. 3 is a partial, perspective, fragmentary view of an acoustical panel according to a typical embodiment of the present invention.

Referring to FIG. 3, the acoustical insulation design of the present invention is illustrated by the encased insulation panel 40. Panel 40 includes a first enclosing film layer 41 and an oppositely disposed second enclosing film layer 42. These two layers are heat sealed along their outer and abutting peripheral edges at seam 43 so as to create a sealed enclosure. The space between sealed film layers 41 and 42 contains a thickness of fiberglass insulation 44. Hole 45 represents one of possibly several clearance openings for any pipe, cable or conduit which must extend through panel 40 due to the specific placement of panel 40 within the compressor or other item of machinery.

Regardless of the size of hole 45 or the number of similar conduit openings, each is lined with portions 41a and 42a of film layers 41 and 42, respectively, which are drawn into hole 45 and heat sealed at the abutting edges of each portion to create seam 47. By drawing portions of each film layer into each opening as a hole liner, approximately half way in to the point where heat sealed seam 47 is created, there are no exposed areas, edges or surfaces of the inner insulation 44.

If panel 40 is used in an environment where a high velocity air flow is present, air flow slits 46 (or holes) are incorporated along the edges of panel 40 in each layer 41 and 42, so that a pressure differential will not cause the panel to deform, balloon or otherwise fail structurally. It is important in these pressure differential environments to have some way to equalize or balance the pressure on opposite sides of each film layer 41 and 42. The slits 46 provide the necessary air flow communication for pressure relief.

Figure 4:
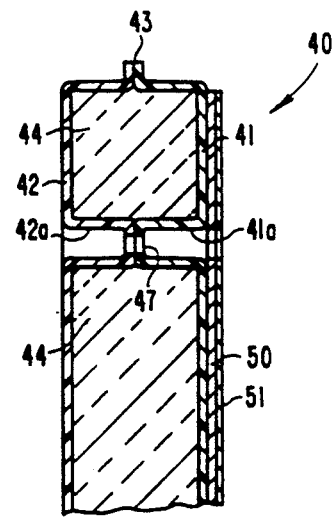
FIG. 4 is a partial, side elevational view in full section of the FIG. 3 acoustical panel.

Referring to FIGS. 3 and 4, the specific design and construction details of panel 40 are illustrated. Layer 41 is fabricated out of a flexible material such as polyvinylchloride (PVC) film which is adhesively bonded to a thickness of acoustical insulation material (fiberglass insulation 44). In the preferred embodiment, the PVC film used for layer 41 is made of a chemical composition using a polymeric plasticizer in order to minimize any reactivity with acrylic-based pressure-sensitive adhesive. A layer 50 of such pressure-sensitive adhesive is attached to the outer surface of layer 41 and serves as a mechanical fastening means for attaching panel 40 to one of the interior surfaces of an air compressor casing or closure or to any internal component or structural member. In the illustrated construction with conduit hole 45, the layer 50 has a similarly sized and aligned hole.

Layer 42 is also fabricated out of polyvinylchloride (PVC) and as with layer 41 is made using a polymeric plasticizer and is adhesively bonded to fiberglass insulation 44. By fabricating both layers 41 and 42 in the same manner, the same roll of material may be used for both layers simplifying production and inventory control. Likewise, use of the same material for both layers 41 and 42 allows the outer layer 50 of pressure-sensitive adhesive to be applied to either or both layers 41 and 42.

The outer surface of layer 50 includes a peel-off paper backing 51. While the adhesive layer 50 has a paper or synthetic backing on both sides initially, the backing on one side is peeled off when the adhesive layer is applied to the PVC film layer, either layer 41 or layer 42. The other paper or synthetic backing material remains in place as part of outer layer 50 until it is time for panel 40 to be installed in the air compressor or other item of machinery and the panel 40 is actually mechanically attached. At that point, backing 51 is removed so as to expose an adhesive surface.

While each layer 41 and 42 is initially sized and shaped to fit the size and shape of fiberglass insulation 44, each layer includes an outer peripheral margin so as to extend up over and around the edge thickness of insulation 44 and yet still leave enough material to abut up against a corresponding peripheral margin of material of the other layer so that these two film layers can be heat-sealed together as represented by seam 43 which extends completely around panel 40. As illustrated, each layer 41 and 42 has a corresponding portion 41a and 42a drawn into hole 45 as a liner. By configuring the two layers so as to be identical, the portions 41a and 42a extend in approximately half the thickness of depth of hole 45 at which point the abutting edges are heat sealed.

In the construcction of panel 40, one option is to use a PVC film which is flexible and somewhat easily shaped to fit the shape of the inner fiberglass mat 44. The degree of flexibility of the film depends in part on the specific film material which is used, such as PVC, and in part on the film thickness. Other film materials which are also suitable for use in layers 41 and 42 of panel 40 include polyethylene film and urethane film. The degree of conformance of the film to the shape of the inner thickness of insulation 44 is enhanced slightly by the fact that insulation 44 is both flexible and resilient. These material properties allow insulation 44 to "give" as the two film layers 41 and 42 are applied and drawn into a tight lamination with insulation 44 as the abutting peripheral edges are heat-sealed at seam 43. In lieu of fiberglass for insulation 44, mineral wool may be used.

Figure 5:
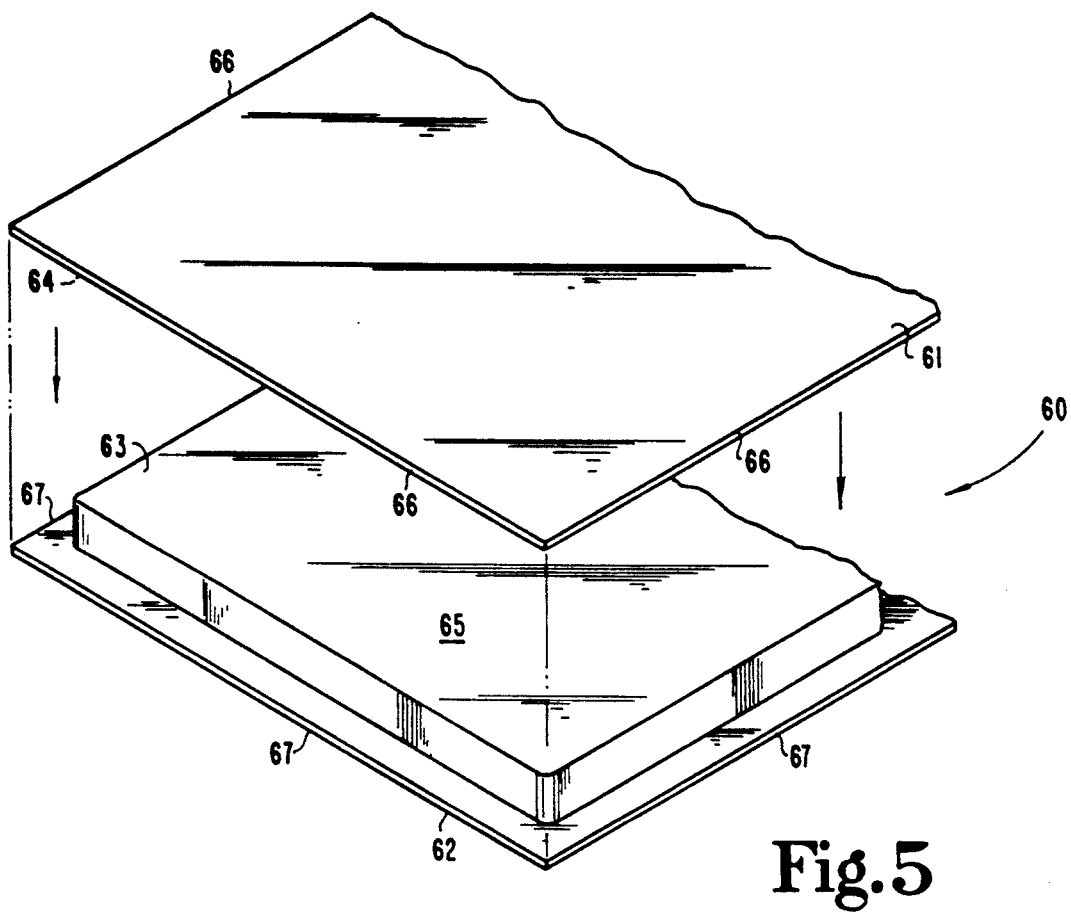
FIG. 5 is an exploded, partial perspective view of an acoustical panel according to a typical embodiment of the present invention.
Figure 6:
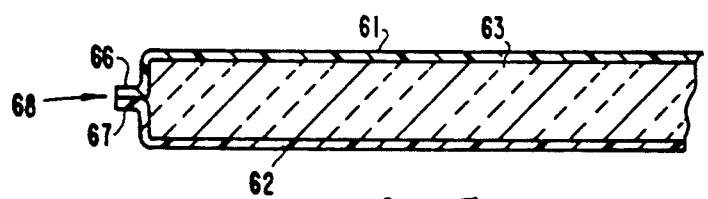
FIG. 6 is a partial, side elevational view in full section of the FIG. 5 acoustical panel as assembled.

While the first described embodiment of the present invention uses adhesive between the insulation 44 and the outer film layers 41 and 42, other embodiments are contemplated. One such alternative embodiment is illustrated in FIGS. 5 and 6 where panel 60 includes outer layers 61 and 62 and a thickness of interior acoustical insulation 63. In this illustrated embodiment, the film material (PVC, polyethylene, urethane) which comprises layer 61 is heated such that a portion of its inner facing surface 64 actually melts into the outer facing surface 65 of insulation 63. A similar construction approach may be used for layer 62 and if each layer is slightly oversized relative to the surface area of insulation 63, a sufficient border will be left to extend down over the sides of the insulation 63 so that the outer perimeter edges 66 and 67 of panels 61 and 62, respectively, can be heat sealed at seam (see FIG. 6). Edge slits are also provided in the finished panel, although not illustrated, and these function in the same manner as edge slits 46. Further, any conduit hole provided in panel 60 is lined with portions of film layers 61 and 62 and sealed at abutting edges to completely encase the insulation 63.

The melting of the film layers into the surfaces of the intermediate layer of insulation precludes the need for an adhesive to be applied for the bonding of the outer film layers to the inner insulation. Although not shown, but still used in this embodiment, is the paper-backed outer adhesive layer for bonding the panel 60 to the selected inside surfaces of the air compressor, machinery or internal components of either.

Figure 7:
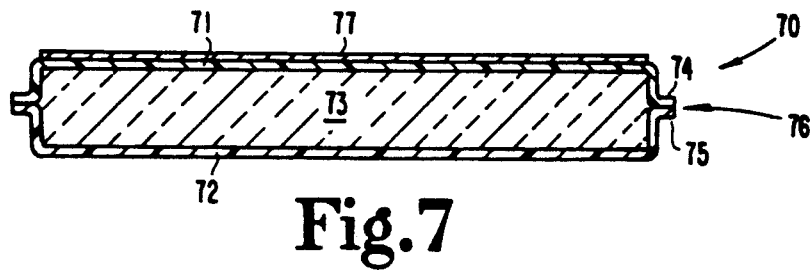
FIG. 7 is a side elevational view in full section of an acoustical panel according to a typical embodiment of the present invention.

Referring to FIG. 7, another construction concept embodiment is illustrated. Panel 70 includes outer layers 71 and 72 and a thickness of inner insulation 73. The two outer layers 71 and 72 may be constructed out of any of the previously mentioned film materials and insulation 73 may be either fiberglass or mineral wool.

In this embodiment, the two outer layers are vacuum formed so as to tightly fit the size, shape and contour of the corresponding halves (in thickness) of insulation 73. If the thickness of insulation 73 is a uniform rectangular solid, then vacuum formed layers 71 and 72 will be designed so as to be virtually identical and extend down approximately half way through the thickness of insulation 73. Each layer 71 and 72 includes an outer peripheral flange 74 (on layer 71) and 75 (on layer 72).

The corresponding flanges of each layer are sized and arranged so as to be in abutment and their facing surfaces are heat-sealed together at seam 76. So long as layer 71 and 72 are virtually identical in size so as to extend half way down through the thickness of insulation 73, then the layers will fit tightly to the contour of insulation 73 and seam 76 will be located at the approximate thickness midpoint of insulation 73.

By accurately vacuum forming the film layers to fit the insulation 73, a minimal amount of stress is placed in the layers and there is little chance of shifting of the insulation or of the layers separating from the insulation. The result of this construction concept is the need for only nominal or minimal strength at seam 76, and there is no need for any adhesive between the outer film layers and the inner insulation. A paper-backed (peel-off) adhesive layer 77 is used to adhere panel 70 to a select surface of an air compressor or other machinery which is to be insulated. Although not illustrated, edge slits are also provided in one or both layers 71 and 72 and function in the same manner as edge slits 46. Further, any conduit hole provided in panel 70 is lined with portions of flim layers 71 and 72 and sealed at abutting edges to completely encase the insulation 73.

While air compressor designs have somewhat been the focus herein, due primarily to their poor acoustical design and the substantial level of objectional noise which is generated by such devices, the various embodiments of the present invention may be used in virtually any sound-insulating environment.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of fabricating an acoustical panel for use in sound reduction comprising the following steps:
   providing an intermediate layer of acoustical insulation material;
   providing a first a vacuum formed, shaped outer layer of a synthetic film material;
   providing a second vacuum formed, shaped outer layer of a synthetic film material, whereby the first and second outer layers are vacuum formed so as to closely conform to the size, shape and contour of the insulation material and whereby upon placing the two film layers on opposite sides of the insulation, their peripheral edges abut completely around the insulation;
   laminating said first and second outer layer to opposite sides of said intermediate layer of acoustical insulation material by heat metal a portion of said first and second outer layers into said intermediate layer of acoustical insulation material; and,
   heat-sealing together outer peripheral edges of said first and second outer layers so as to encase said intermediate layer.

* * * * *